United States Patent
Hijii (10) Patent No.: US 6,459,911 B1
(45) Date of Patent: Oct. 1, 2002

(54) PORTABLE TELEPHONE EQUIPMENT AND CONTROL METHOD THEREFOR

(75) Inventor: Kazuyoshi Hijii, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/407,288

(22) Filed: Sep. 29, 1999

(30) Foreign Application Priority Data

Sep. 30, 1998 (JP) .......................................... 10-276292

(51) Int. Cl.⁷ .............................. H04B 1/38; H04M 1/00
(52) U.S. Cl. ................... 455/563; 455/566; 379/428.02
(58) Field of Search ................. 379/430, 446, 379/447, 428.02; 455/90, 74, 66, 41, 42, 550, 93, 569, 566, 568, 575, 563, 564, 151.1, 151.2; 381/163, 182, 370, 375, 329; 704/275, 248

(56) References Cited

U.S. PATENT DOCUMENTS

| | | | | |
|---|---|---|---|---|
| 4,087,636 A | * | 5/1978 | Akiyama et al. | 455/563 |
| 4,870,686 A | * | 9/1989 | Gerson et al. | 704/234 |
| 5,222,121 A | * | 6/1993 | Shimada | 379/88.03 |
| 5,450,525 A | * | 9/1995 | Russell et al. | 704/275 |
| 5,584,052 A | * | 12/1996 | Gulau et al. | 455/79 |
| 5,978,689 A | * | 11/1999 | Tuoriniemi et al. | 455/569 |
| 5,991,637 A | * | 11/1999 | Mack, II et al. | 455/550 |
| 6,091,812 A | * | 7/2000 | Iglehart et al. | 379/308 |
| 6,198,947 B1 | * | 3/2001 | Barber | 455/563 |
| 6,233,002 B1 | * | 5/2001 | Shibayama | 348/14.05 |
| 6,240,303 B1 | * | 5/2001 | Katzur | 455/563 |
| 6,272,361 B1 | * | 8/2001 | Courtis et al. | 455/569 |

FOREIGN PATENT DOCUMENTS

| | | | |
|---|---|---|---|
| EP | 2327555 A | | 1/1999 |
| GB | 2308775 | * | 7/1997 |
| JP | 58-141060 | | 8/1983 |
| JP | 2-260951 | | 10/1990 |
| JP | 403029548 | * | 2/1991 |
| JP | 3-123250 | | 5/1991 |
| JP | 4-306944 | | 10/1992 |
| JP | 5-91584 | | 4/1993 |
| JP | 405103059 | * | 4/1993 |
| JP | 9-74580 | | 3/1997 |
| JP | 10-23115 | | 1/1998 |
| JP | 10-84403 | | 3/1998 |
| JP | 10-233826 | | 9/1998 |
| JP | 11-122335 | | 4/1999 |

OTHER PUBLICATIONS

Japanese Office Action dated Oct. 3, 2000, with partial translation.
European Search Report dated Mar. 21, 2000.

* cited by examiner

*Primary Examiner*—Vivian Chin
*Assistant Examiner*—Charles N. Appiah
(74) *Attorney, Agent, or Firm*—McGinn & Gibb, PLLC (57) ABSTRACT

A portable telephone has an external earphone set electrically connected thereto by a jack plug and socket. The earphone set includes a microphone, at least one speaker, and a remote control unit having a display and a control switch. The portable telephone performs a calling operation depending on an operation of the control switch. When a destination phone number is input by means of voice recognition, it is displayed on the display for check. The dialing is started by the voice input. Further, the input phone number can be corrected by means of the control switch and the voice input.

10 Claims, 7 Drawing Sheets

PORTABLE TELEPHONE EQUIPMENT AND CONTROL METHOD THEREFOR

BACKGROUND OF THE INVENTION

1. Field of the Invention

The present invention relates to portable telephone equipment, and in particular to portable telephone equipment controlled by an earphone having a microphone and a control method for the portable telephone device using a remote control unit provided in the earphone.

2. Description of the Related Art

In recent years, an increasing number of people have possessed a portable telephone such as a cellular phone or a PHS (Personal Handy-phone System) set and have used an earphone or headphones to talk. Especially, a PHS telephone is supplied to each person in a company and is used with an earphone to talk while each user working.

On the other hand, there have been proposed several kinds of portable telephone device having audio equipment therein. For instance, Japanese Patent Application Laid-Open Publication No. 10-23115 discloses a portable telephone having headphone-stereo equipment included therein. The portable telephone is provided with a headphone jack which is connected to a plug of the headphones having a remote control unit and a microphone. The telephone is designed such that a user can quickly respond to an incoming call using the remote control unit when playing the headphone stereo and can start conversation using the headphones and the microphone.

Japanese Patent Application Laid-Open Publication No. 5-91584 discloses an earphone having a remote control unit which is provided with a microphone for telephone transmitter. The earphone is designed to enhance the operability of a portable combination telephone/audio device.

Further, Japanese Patent Application Laid-Open Publication No. 9-74580 discloses a portable combination audio/pager device which can easily inform its user of the occurrence of an incoming call. More specifically, the portable combination audio/pager device is connected to earphones through a remote control unit having a display. When receiving a paging signal, the message of the paging signal is displayed on the display of the remote control unit.

Furthermore, Japanese Patent Application Laid-Open Publication No. 10-84403 discloses a portable combination audio/telephone device which is provided with a remote control unit having an earphone speaker which is used for both audio output and telephone transmitter.

The conventional portable telephones an described above allow easy operation for incoming call. However, when the user wants to make a call, it is necessary to take the portable telephone in his/her hand to check the calling telephone number displayed on LCD. In some cases, he/she must take out the portable telephone from his/her bag before calling operation. This is a disadvantage of the conventional potable telephone.

SUMMARY OF THE INVENTION

An object of the present invention is to provide a portable telephone device which allows easy check of a destination number when calling and easy check of a source number when called.

Another object of the present invention is to provide a combination of a portable telephone and an audio device which allows easy check of a destination number when calling and easy check of a source number when called.

According to the present invention, a portable telephone has an external accessory electrically connected thereto by a detachable connector. The external accessory comprises: a microphone; at least one speaker: a display: and a remote control switch. The portable telephone comprises a telephone controller controlling wireless telephone communication, wherein the telephone controller performs a calling operation depending on an operation of the remote control switch such that a destination phone number is displayed for check on the display before dialed.

The telephone controller preferably has a speech recognition mode for recognizing a string of voice signals inputted through the microphone of the external accessory to produce the destination phone number.

The telephone controller may change into the speech recognition mode depending on an operation of the remote control switch. The telephone controller may start the destination, phone number dialing by voice input in the speech recognition mode.

Preferably, the destination phone number displayed on the display is deleted in digits by operating the remote control switch and is corrected by the voice input.

The destination phone number may be inputted in digits by the voice input. Alternatively, the destination phone number may be obtained by searching a table for a voice-input name, the table containing previously registered names and corresponding phone numbers.

The external accessory may be a set of headphones having a structure that two headphone speakers are connected to a remote control unit having the display and the remote control switch therein, the remote control unit having a jack plug connected thereto, wherein a predetermined one of the two headphone speakers serves as the microphone.

According to the present invention, in a combination of a portable telephone and a portable audio device connected to an earphone set.

the earphone set comprises: a microphone; at least one speaker; a display; and a remote control switch, the portable audio device comprising a first connector for the earphone set: a second connector for the portable telephone; and a controller controlling such that a control signal and a display signal are transferred between the earphone set and the portable telephone depending on control of the portable telephone, and the portable telephone comprising a telephone controller controlling wireless telephone communication, wherein the telephone controller performs a calling operation depending on an operation of the remote control switch such that a destination phone number is displayed for check on the display before dialed.

As described above, according to the present Invention, since the destination phone number is displayed on the display of the external accessory, the user can easily check the destination phone number before calling without taking the portable telephone out.

DETAILED DESCRIPTION OF THE PREFERRED EMBODIMENTS

Figure 1:
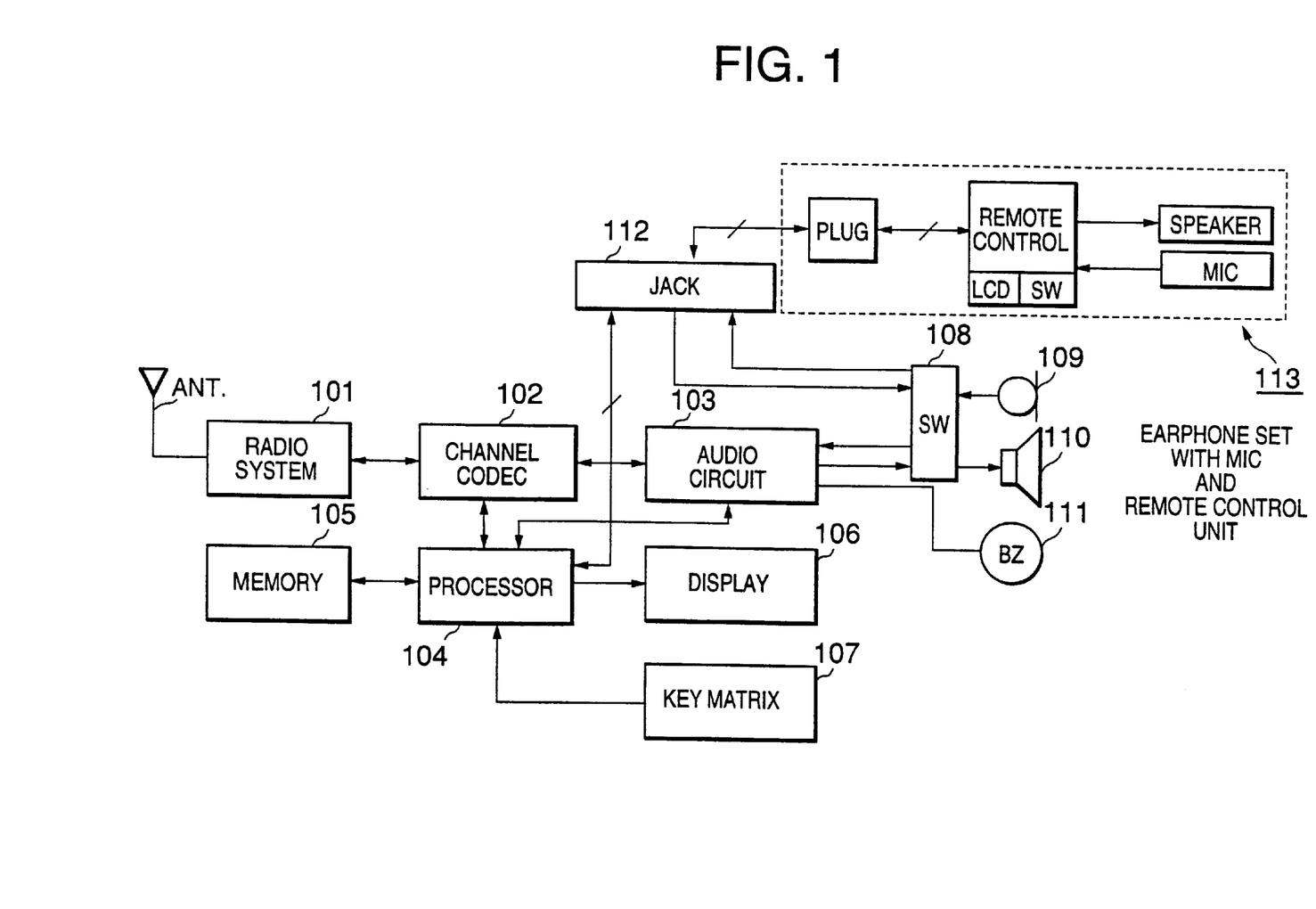
FIG. 1 is a block diagram illustrating a portable telephone according to an embodiment of the present invention.

Referring to FIG. 1, a mobile telephone can be controlled by a remote control unit of an earphone set 113. As described later, the remote control unit is provided with a display (LCD) for displaying necessary information including a destination/source telephone number.

More specifically the mobile telephone is provided with a radio system 101 and a channel encoder/decoder (codec) 102. The radio system 101 is designed to modulate a carrier according to transmission data to transmit it through an antenna ANT and demodulate a radio signal received through an antenna ANT to produce reception data. The channel codec 102 receives the reception data from the radio system 101 and decodes it to produce reception audio data and control data. The channel codec 102 receives audio transmission data from an audio circuit 103 and encodes it to produce transmission data to be sent to the radio system 101. The reception audio data is sent to the audio circuit 103 and the reception control data is sent to a processor 104.

The audio circuit 103 converts the reception audio data to an analog reception audio signal. On the other hand, the audio circuit 103 converts an analog transmission voice signal to transmission audio data, which is encoded by the channel codec 102 to produce the transmission data.

The processor 104 uses a memory 105 to control the operations of the mobile telephone. The memory 105 is composed of a read-only memory (ROM) storing a communication sequence program and other control programs including a call making program according to the present embodiment, a random access memory (RAM) for storing various kinds of data including a table containing registered names and their phone numbers, and an electrically erasable programmable ROM (EEPROM) for storing identification number or the like. By referring to the EEPROM, the processor 104 determines whether a received selective calling signal is addressed to the telephone itself. Necessary information is displayed on a display 106 under control of the processor 104 and an instruction such as dialing in input by the user operating a key matrix 107. The display 106 is capable of displaying alphanumeric characters and pictorial symbols illuminated, which may be composed of an liquid crystal display (LCD) and an light emitting diode (LED).

The audio circuit 103 is connected to a microphone 109 and a loudspeaker 110 through a switch 108 and further to a sounder 111 composed of a buzzer or beeper. The switch 108 normally connects the audio circuit 103 to the microphone 109 and the loudspeaker 110 and, when the plug of an earphone set 113 is inserted into a jack 112 of the mobile telephone, the switch 108 connects the audio circuit 103 to the earphone set 113 through the jack 112.

Figure 2:
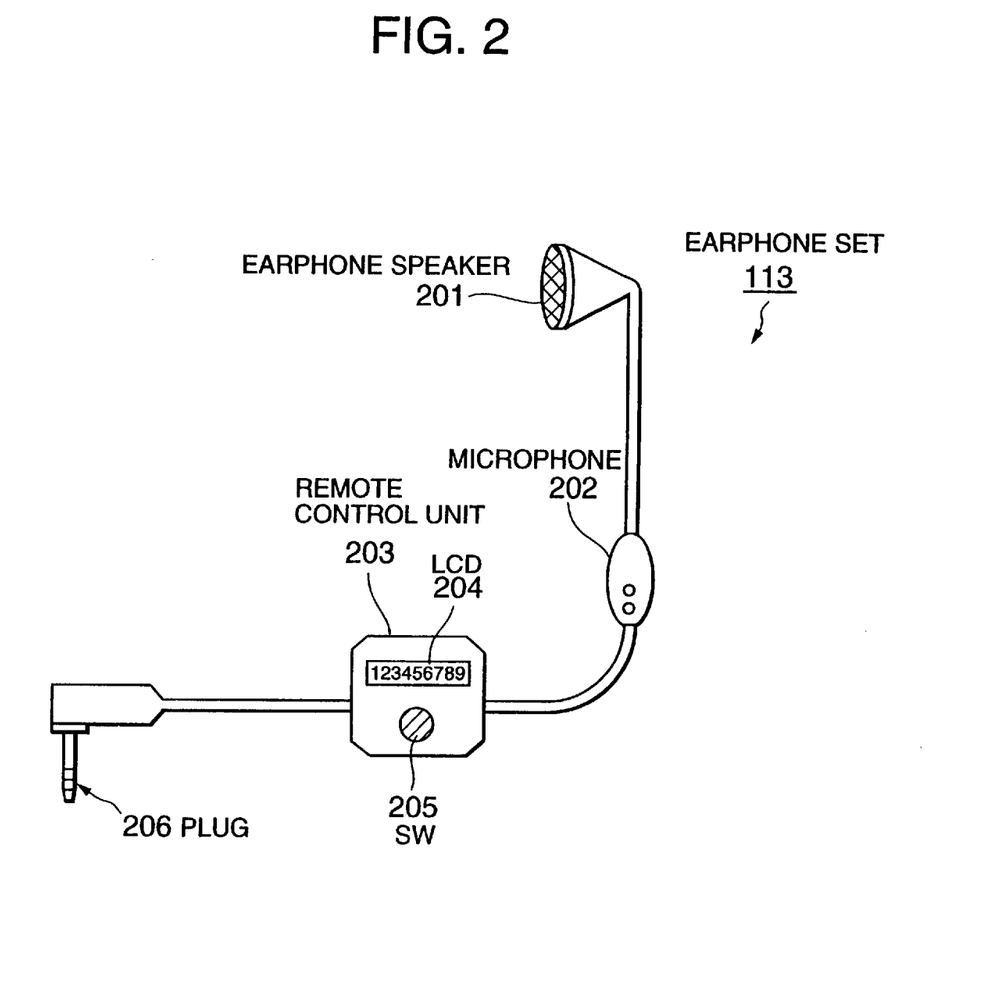
FIG. 2 is a schematic diagram showing an appearance of an earphone used for the portable telephone of FIG. 1.

As shown in FIG. 2, the earphone set 113 is composed of an earphone speaker 201 and a microphone 202, which are connected to a emote control unit 203 through cables. The remote control unit 203 is provided with a LCD 204 and a control switch 205. The remote control unit 203 is connected to a plug 206 through a cable. The plug 206 has four electrodes and can be inserted into the jack 112 of the mobile telephone.

In the case where the earphone not 113 is not used, the audio circuit 103 outputs the analog reception voice signal to the loudspeaker 110. The microphone 109 converts a sound wave to an analog voice signal and sends it as an analog transmission voice signal to the audio circuit 103.

When the plug 206 of the earphone set 113 is inserted into the jack 112, the control switch 205 of the remote control unit 203 can be used to control the operation of the mobile telephone while checking information displayed on the LCD 204. As described later, when an incoming call occurs, the source telephone number of a call from someone can be displayed an the LCD 204. Therefore, the user can check the displayed source address before off-hook. On the other hand, when the user is making a call, a push of the control switch 205 changes the operation mode of the mobile telephone to a speech recognition mode. Thereafter, the user's voice is converted into data, that is, the telephone number of a destination. The inputted destination number can be confirmed by the user looking at the LCD 204 of the remote control unit 203. If the inputted destination number is in error, the error can be easily corrected by the user operating the control switch 205. The details will be described hereafter.

Figure 3:
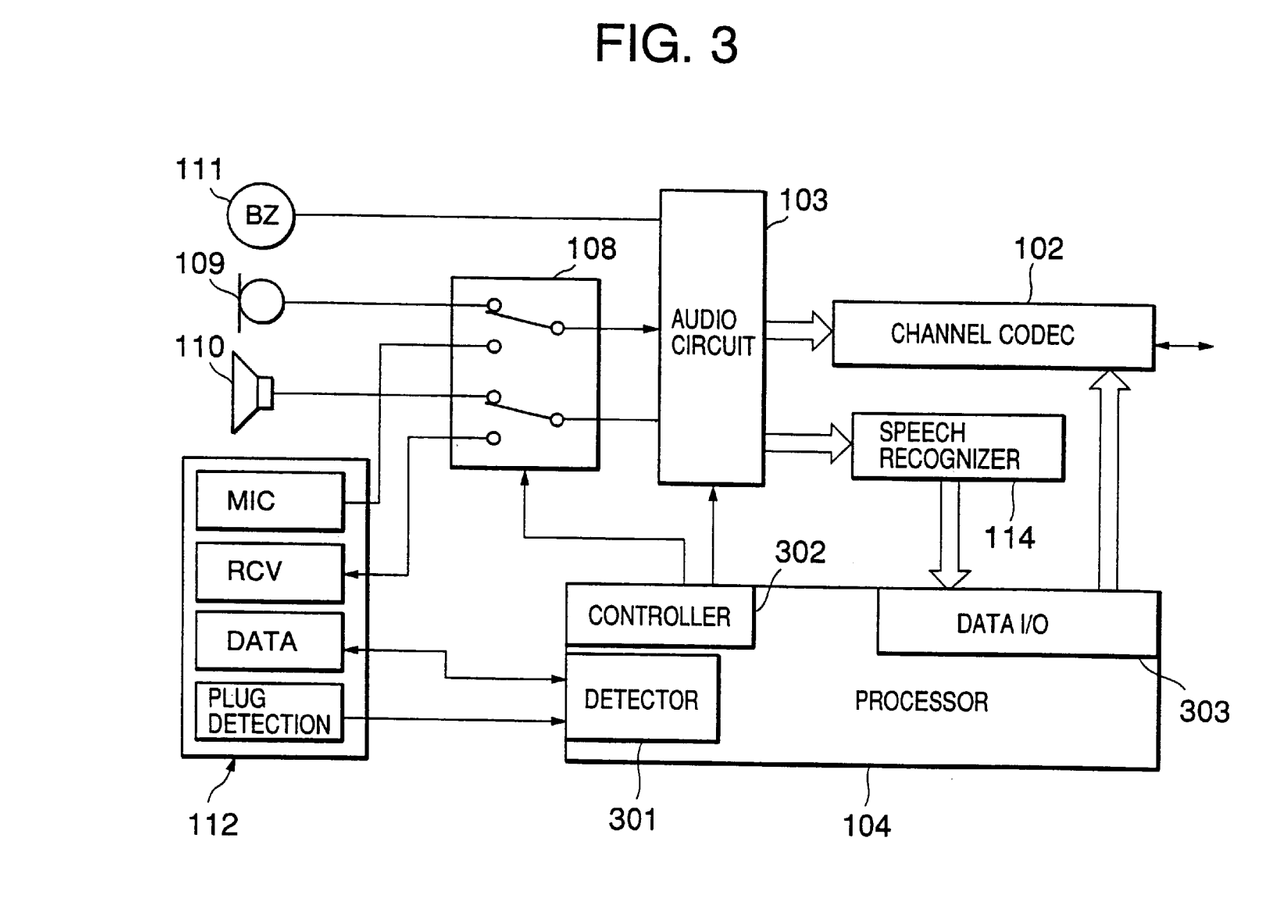
FIG. 3 is a block diagram showing a further detailed circuit around an audio circuit of FIG. 1.

FIG. 3 shows the detailed circuit configuration around the audio circuit 103, where circuit blocks similar to those previously described with reference to FIG. 1 are denoted by the same reference numerals and their descriptions are omitted.

As shown in FIG. 3, the jack 112 has a plug detection mechanism and four terminals, MIC, RCV, DATA, and GND, corresponding respectively to the electrodes of the plug 206 of the earphone set 113. The terminal MIC is used to receive an analog transmission voice signal from the earphone speaker 201. The terminal RCV is used to send an analog reception voice signal from the audio circuit 103 through the switch 108. The terminal DATA is used to transfer a control signal and/or a display signal between the processor 104 and the remote control unit 203. The terminal GND (not shown) is used to supply a grounding level. The plug detection mechanism is used to determine whether the plug 206 is inserted into the jack 112.

The processor 104 implements a signal detector 301, a controller 302, and a date input/output section 303. The signal detector 301 is connected to the terminal GND and the plug detection mechanism of the jack 112 so as to check whether the plug 206 of the earphone set 113 to inserted into the jack 112. Further, the signal detector 301 is connected to the terminal DATA to send a control signal and a display signal to the remote control unit 203 and receive a remote control signal from the remote control unit 203. The mode of the mobile telephone can be changed depending on the remote control signal received from the remote control unit 203. The controller 302 controls the switch 108 depending on whether the plug 206 of the earphone set 113 is inserted into the jack 112. It should be noted that control data from the remote control unit 203 and display data from the processor 104 have different headers attached therewith because they may concurrently appear on the same control line.

In the case of the speech recognition mode, a speech recognizer 114 is activated and performs speech recognition of voice data inputted by the microphone 202 of earphone set 113 to produce recognized character data. The data input/output section 303 inputs the recognized character data from the speech recognizer 114 and outputs necessary data to the channel codec 102.

CALL TAKING OPERATION

Figure 4:
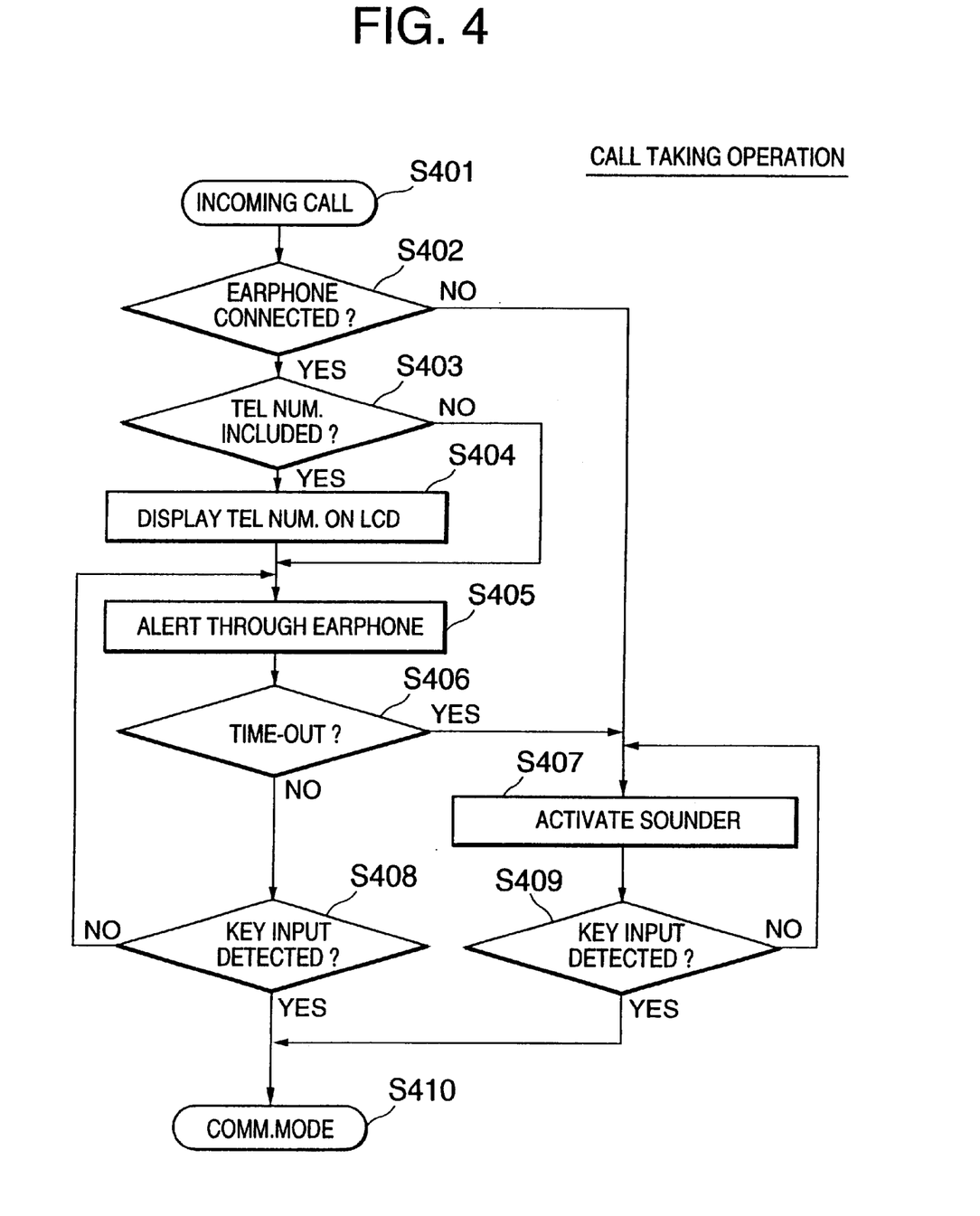
FIG. 4 is a flow chart showing a control operation of a processor upon arrival at the portable telephone according to the embodiment.

Referring to FIG. 4, it is intermittently determined whether an incoming call occurs and, when an incoming call occurs (step 401), the processor 104 checks whether the earphone set 113 in connected to the jack 112 (step 402). In the case where the earphone set 113 has been connected, it in further determined whether the received selective calling signal includes a source phone number (step S403). If included, the processor 104 sends display data of the source phone number to the remote control unit 203 through the terminal DAA of the jack 112 so that the source phone number is displayed on the display 106 of the remote control unit 203 (step S404). Further, the processor 104 instructs the audio circuit 103 to send an alert signal to the earphone speaker 201 through the switch log and the terminal RCV so that alert indicating the occurrence of an incoming call is made by the earphone speaker 201 (step S405). If not included, alert is by the earphone speaker 201 Without doing the step S404. Such an alert allows the user to pay attention to the LCD 204 and the displayed phone number may inform the user who is calling.

When the alert by the earphone speaker 201 is activated, the processor 104 start a timer for a predetermined time period. If the user pushes the control switch 205 of the remote control unit 203 before time-out (NO in step S406 and YES in step S408), then the processor 104 changes the operation mode to the telephone communication mode (step S410). When timeout occurs (YES in step S406), the processor 104 activates the sounder ill of the mobile telephone (step S407), ensuring reliable alert for informing the user of the occurrence of an incoming call, it the user pushes the control switch 205 of the remote control unit 203 or any key of the key matrix 107 (YES in step S409), then the processor 104 changes the operation mode to the telephone communication mode (step S410).

CALL MAKING OPERATION

In the case where the earphone set 113 is connected to the mobile telephone, a call can be made by using the key matrix 107 or by means of voice input from the microphone 202 of the earphone set 113.

Figure 5:
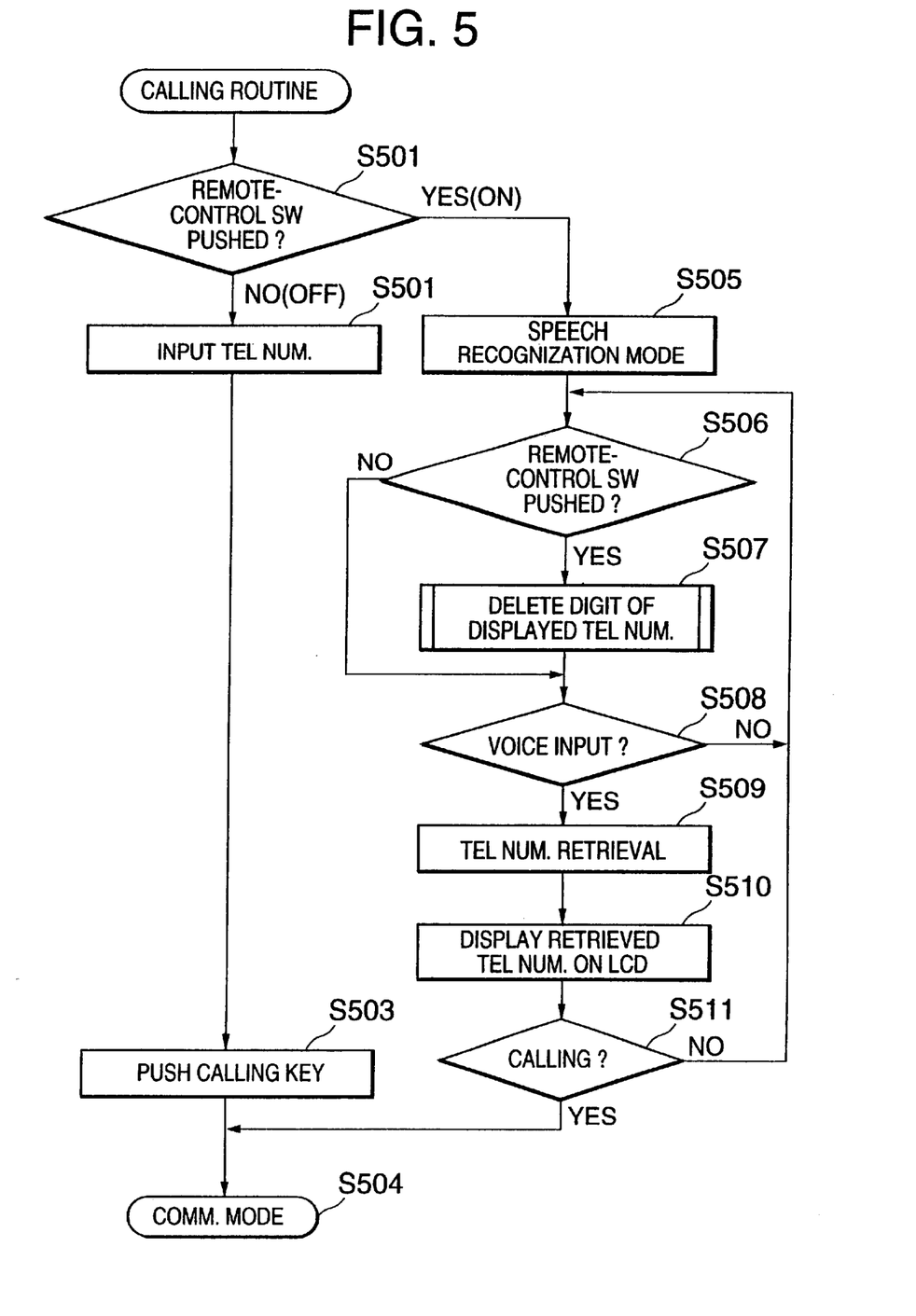
FIG. 5 is a flow chart showing a control operation of a processor when calling according to the embodiment.

Referring to FIG. 5, in the case of using the key matrix 107, a destination phone number is directly input by operating the ton-key of the key matrix 107 without pushing the control switch 205 of the remote control unit 203 (NO in step S501 and step S502). Thereafter, the user pushes a calling key of the key matrix 107 to make a call (step S503), and then the processor 104 changes the mode to communication mode (step S504).

In the case of calling by means of voice input, the user pushes the control switch 205 of the remote control unit 203 (YES in step S501). This causes a control signal to be transferred from the remote control unit 203 to the processor 104 through the terminal DATA of the jack 112. This control signal causes the processor 104 to change the operation mode from the waiting mode to the speech recognition mode (atop S505).

In the speech recognition mode, when detecting a push of the control switch 205 (YES in step S506), the processor calls a phone number deletion routine (S507), which will be described later. Unless the control switch 205 is not pushed (NO in step S506), the processor 104 waits for voice input (step S508).

In this embodiment, the processor 104 can recognize both numerals and registered names. When a string of numerals are inputted by moans of voice input, the processor 104 recognizes each input numeral by searching registered numerals (step S509) and the recognized numerals are each displayed as a destination phone number on the LCD 204 (step S510), on the other hand, when a destination name is inputted by means of voice input, the processor 104 searches the registered names for the input name (step S509) and the phone number corresponding to each hit is displayed on the LCD 204 (step S510). If two or more hits are found, all the phone numbers corresponding to the hits are displayed and then the user can select one of them as a destination phone number by operating the control switch 205. Since the destination phone number is displayed on the LCD 204, the user can confirm the phone number before calling.

When the destination phone number is determined in such a way and it is correct, the user inputs a calling voice instruction (for example, "transmit", "call", "send" or the like) through the microphone 202 (step S511). Alternatively, the calling key of the key matrix 107 may be pushed. The calling instruction causes the processor 104 to change the mode to the communication mode to start the known calling sequence (step S504).

If the input destination phone number is in error, the user pushes the control switch 205 (NO in step S511 and YES in step S506). By this, the phone number deletion routine is called and performed (step S507) as described hereafter.

Figure 6:
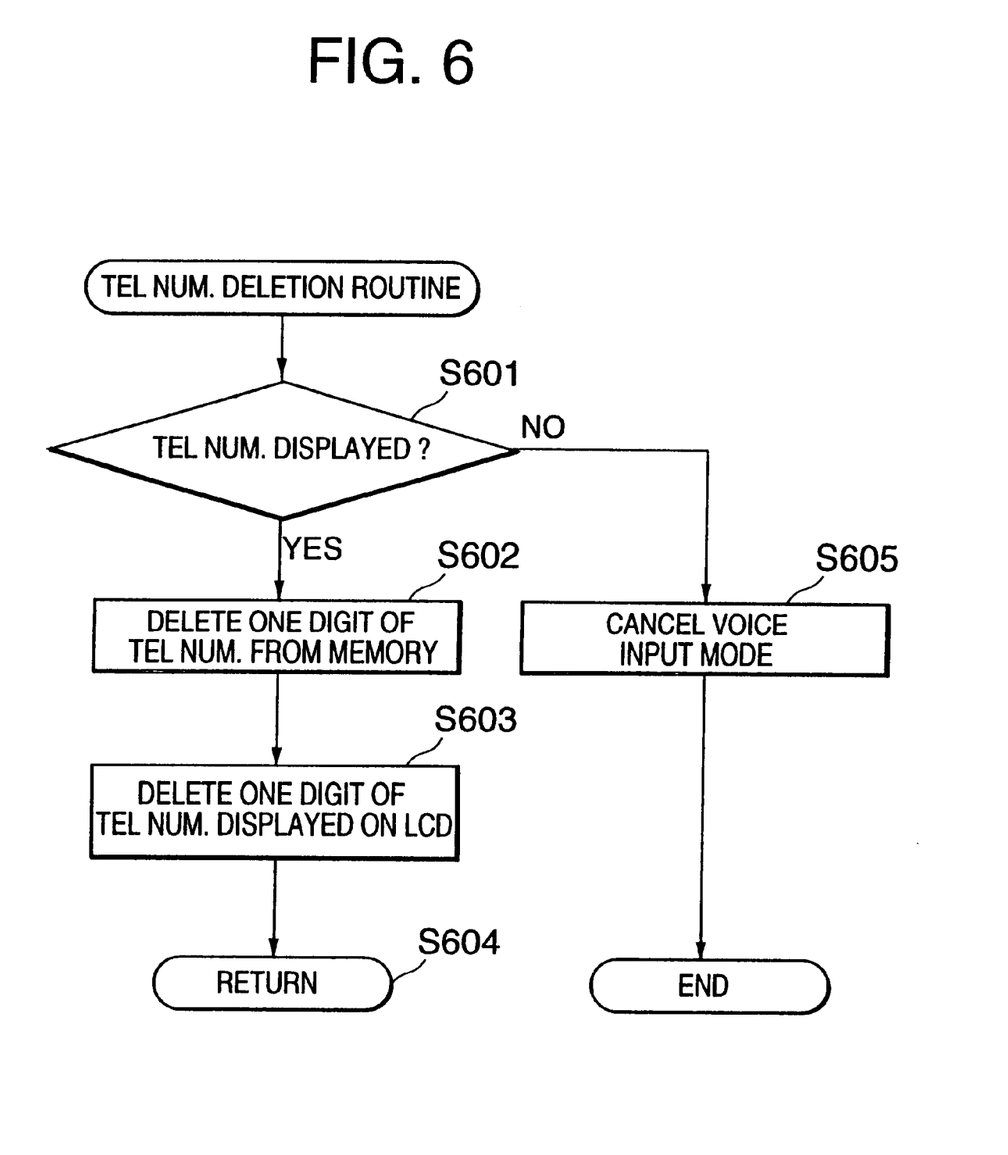
FIG. 6 is a flow chart showing a telephone number deletion routine of FIG. 5.

Referring to FIG. 6, if at least one digit of the phone number is displayed on the LCD 204 (YES in step S601), the latest-input digit of the displayed phone number is deleted from the RAM and from the LCD 204 (steps S602 and S603). Thereafter, control goes back to the step S508 of FIG. 5 (step S604). Therefore, as long as at least one digit of the phone number is displayed on the LCD 204 (YES in step S601), the latest-input digit of the displayed phone number is deleted at each push of the control switch 205 (steps S602 and S603). Therefore, the user can delete all the input data by pushing the control switch 205. If no digit is displayed on the LCD 204 (NO in step S601), the voice-input mode is canceled (step S605) and the calling operation is terminated.

As described above, the user can control the mobile telephone using the remote control unit 203 of the earphone set 113. Therefore, telephone conversation is allowed in such a state that the mobile telephone itself is put in the bag or on the belt and both hands are free.

AUDIO EQUIPMENT CONNECTION

As a second embodiment of the present invention, a portable telephone can also be controlled by portable headphone-stereo equipment which is provided with a headphone set having a remote control unit with an LCD. Since the headphone speakers usually serve only as telephone receivers, some particular technique is needed e.g. switching one headphone between a speaker and a microphone.

Figure 7:
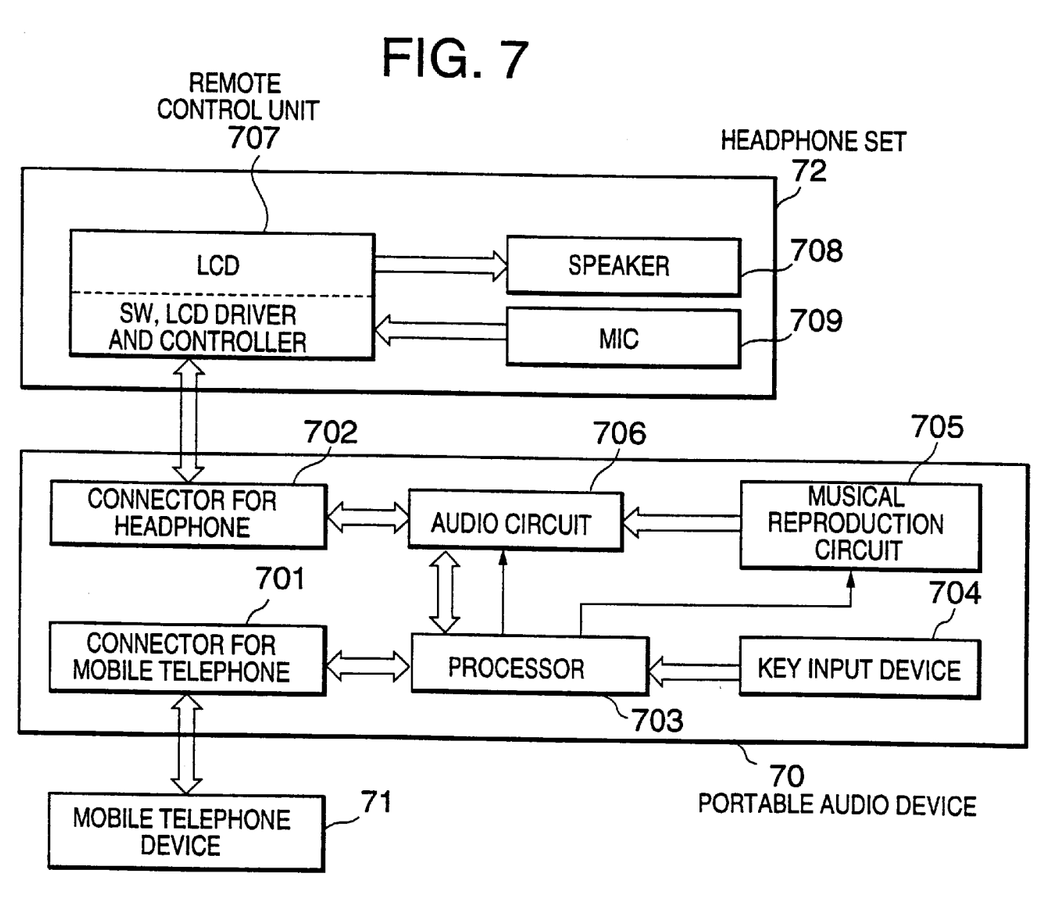
FIG. 7 is a block diagram showing audio equipment connected to the portable telephone of FIG. 1.

Referring to FIG. 7, a portable audio device 70 is connected to a mobile telephone device 71 through a jack plug-and-socket connector and the portable audio device 70 is further connected to a headphone set 72 through a jack plug-and-socket connector.

The portable audio device 70 is provided with a connector 701 for mobile telephone and a connector 702 for headphones. A processor 703 controls the operations of the audio device 70 according to an instruction input by a key input device 704. The major purpose of the portable audio device 70 is musical reproduction for cassette tape, compact disc, mini disc, or a semiconductor memory, which is performed by a musical reproduction circuit 705. A reproduced audio signal is adjusted by an audio circuit 706 and than the adjusted audio signal is output to the headphone set 72 through the connector 702.

In this embodiment, the mobile telephone device 71 has the same circuit configuration as in FIGS. 1 and 3. The mobile telephone device 71 is connected to the portable audio device 70 through the jack 112 and the connector 701. The connector 701 has a plug detection mechanism and four terminals, MIC, RCV, DATA, and GND, which correspond to the connector 701 for mobile telephone as shown in FIG. 3. In the case where the mobile telephone device 71 is connected to the portable audio device 70, the processor 703 of the portable audio device 70 transfers a display signal received from the mobile telephone device 71 to the headphone set 72 through the connector 702. Further, under control of the mobile telephone device 71, the processor 703 instructs the audio circuit 706 to produce an alert audio signal indicating the occurrence of an incoming call to send it to the headphone set 72. On the other hand, the processor 703 transfers a control signal received from the headphone set 72 to the mobile telephone device 71 through the connector 701.

The headphone set 72 includes a remote control unit 707 having an LCD and a controller therein. The headphone set 72 is provided with two headphone speakers 708 and 709. However, in the case of communication mode, one is used for receiver and the other for transmitter. In other words, as shown in FIG. 7, the headphone speaker 708 is used for receiver and the other headphone speaker 709 is used as a microphone for transmitter. The analog reception audio signal received from the portable audio device 70 is output to the speaker 708. An analog transmission audio signal produced by the microphone 709 is transferred to the mobile telephone device 71 through the audio circuit 706 of the portable audio device 70.

In the above portable audio device 70 connected to the mobile telephone device 71, the call taking and making operations and the input phone number correction operation are basically the same as those shown in FIGS. 4–6. According to the second embodiment, therefore, the respective headphones for the portable audio device are also used as telephone receiver and transmitter. In other words, the remote control unit 707 of the headphone set 72 can be used to control the call taking and making operations of the mobile telephone device 71 through the portable audio device 70. Such a portable audio device designed to allow control of the mobile telephone device 71 can provide the same advantage as in the first embodiment.

Although the LCD is provided in the remote control unit at the middle of an earphone cable in the above embodiments, another cable dedicated to a display device may be provided to transmit the destination phone number to the display device to display it thereon.

What is claimed is:

1. A portable telephone that includes an external accessory, which is electrically connected to the portable telephone by a detachable connector,
the external accessory, comprising:
   a microphone;
   at least one speaker;
   a display;
   and a remote control switch, and
the portable telephone comprising a telephone controller that controls
   wireless telephone communication,
   a speech recognition mode that includes a voice input mode,
   the display on which a sequentially-voiced plurality of digits recognized by the speech recognition mode is displayed,
   a memory in which the sequentially-voiced plurality of digits recognized by the speech recognition mode is stored,
   deleting a last-voiced digit of the sequentially voiced, plurality of digits from the display and the memory when the remote control switch is activated, and
   returning to the voice input mode, unless a first-voiced digit of the sequentially-voiced plurality of digits is deleted, at which point, the voice input mode is canceled.

2. A portable telephone according to claim 1, wherein the telephone controller enters the speech recognition mode upon activation of the remote control switch.

3. A portable telephone according to claim 1, wherein the operation of dialing a destination phone number is controlled by the voice input mode.

4. A portable telephone according to claim 1, wherein the destination phone number is obtained by searching a table for a voice-input name, the table containing a plurality of previously registered voice-input names and each of the plurality of previously registered voice-input names having a corresponding destination phone number.

5. A portable telephone according to claim 1, wherein the external accessory comprises an earphone set in which the microphone and the at least one speaker are connected to a remote control unit including the display and the remote control switch and the remote control unit connects to the earphone set by a jack plug.

6. A portable telephone according to claim 1, wherein the external accessory comprises a headphone set in which the microphone and the at least one speaker are connected to a remote control unit including the display and the remote control switch and the remote control unit connects to the headphone set by a jack plug.

7. A portable telephone according to claim 1, wherein the external accessory comprises a set of headphones in which two headphone speakers, one of which serves as the microphone, are connected to a remote control unit including the display and the remote control switch and the remote control unit connects to the set of headphones by a jack plug.

8. A system including a portable telephone and a portable audio device, which are connected to an earphone set,
the earphone set, comprising:
   a microphone;
   at least one speaker;
   a display; and
   a remote control switch,
the portable audio device, comprising:
   a first connector for the earphone set;
   a second connector for the portable telephone; and
   a controller that controls a transfer of a control signal and a display signal between the earphone set and the portable telephone depending on another control signal received from the portable telephone, and
the portable telephone comprising a telephone controller that controls
   wireless telephone communication,
   a speech recognition mode that includes a voice input mode,
   the display on which a sequentially-voiced plurality of digits that are recognized by the speech recognition mode is displayed,
   a memory in which the sequentially-voiced plurality of digits that are recognized by the speech recognition mode is stored, deleting a last-voiced digit of the sequentially-voiced plurality of digits from the display and the memory when the remote control switch is activated, and returning to the voice input mode, unless a first-voiced digit of the sequentially-voiced plurality of digits is deleted, at which point, the voice input mode is canceled.

9. A method of making a telephone call from a portable telephone that includes an external accessory, which is electrically connected to the portable telephone by a detachable connector, the method, comprising:

activating a speech recognition mode that includes a voice input mode by a remote control switch located on the external accessory;

sequentially voicing a plurality of digits into a microphone of the external accessory and then displaying on a display located on the external accessory and storing in a memory, each of the sequentially-voiced plurality of digits being recognized by the speech recognition mode;

activating the remote control switch to delete a last-voiced digit of the sequentially-voiced plurality of digits from the display and the memory; and returning to the voice input mode, unless the first-voiced digit of the plurality of digits is deleted.

10. A method of making a telephone call from a portable telephone that includes an external accessory, which is electrically connected to the portable telephone by a detachable connector, wherein if the first-voiced digit of the plurality of digits is deleted, the voice input mode is canceled.

* * * * *